United States Patent
Pan et al.

(10) Patent No.: US 11,908,237 B2
(45) Date of Patent: Feb. 20, 2024

(54) IMAGE PROCESSING METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventors: Jiali Pan, Beijing (CN); Shupeng Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/886,101

(22) Filed: Aug. 11, 2022

(65) Prior Publication Data

US 2022/0392257 A1 Dec. 8, 2022

Related U.S. Application Data (63) Continuation of application No. PCT/CN2021/085326, filed on Apr. 2, 2021.

(51) Int. Cl.
   *G06V 40/16* (2022.01)
   *G06T 5/50* (2006.01)
   *G06T 13/40* (2011.01)

(52) U.S. Cl.
   CPC .......... *G06V 40/168* (2022.01); *G06T 5/50* (2013.01); *G06T 13/40* (2013.01); *G06V 40/165* (2022.01)

(58) Field of Classification Search
   CPC .. G06V 40/168; G06V 40/165; G06V 40/161; G06T 5/50; G06T 13/40; G06T 3/0012; G06T 5/005
   See application file for complete search history.

(56) References Cited

U.S. PATENT DOCUMENTS

| 8,953,909 B2 | 2/2015 | Guckenberger et al. |
| 2009/0285456 A1* | 11/2009 | Moon ................. G06V 40/176 382/118 |

(Continued)

FOREIGN PATENT DOCUMENTS

| CN | 101556701 A | 10/2009 |
| CN | 107798276 A | 3/2018 |

(Continued)

OTHER PUBLICATIONS

International Patent Application No. PCT/CN2021/085326; Int'l Search Report; dated Jul. 7, 2021; 2 pages.

(Continued)

*Primary Examiner* — Phuoc Tran
(74) *Attorney, Agent, or Firm* — BakerHostetler (57) ABSTRACT

Embodiments of the present disclosure relate to the field of image processing technologies and disclose an image processing method and apparatus, an electronic device, and a computer-readable storage medium. The image processing method includes: when an obtained first image includes a human face, performing a first transformation process on the first image to obtain a second image; determining, based on a first target face key point of the human face in the first image, a target position, in the first image, of a second target face key point of the human face in the second image; performing a first movement process on the second image based on the target position; and generating a target image based on the first image and the second image processed through the first movement process, and displaying the target image.

13 Claims, 2 Drawing Sheets

(56) References Cited

U.S. PATENT DOCUMENTS

| | | | |
|---|---|---|---|
| 2012/0223956 A1 | 9/2012 | Saito et al. | |
| 2014/0043329 A1* | 2/2014 | Wang | G06T 7/593 345/420 |
| 2017/0084069 A1 | 3/2017 | Kim et al. | |
| 2018/0025506 A1* | 1/2018 | Li | G06V 40/176 345/473 |
| 2018/0204052 A1 | 7/2018 | Li et al. | |
| 2019/0304152 A1* | 10/2019 | Saà-Garriga | G06T 11/60 |
| 2020/0058147 A1 | 2/2020 | Imoto et al. | |
| 2020/0258206 A1* | 8/2020 | Shen | G06T 17/20 |
| 2021/0201458 A1* | 7/2021 | Wu | G06V 40/171 |

FOREIGN PATENT DOCUMENTS

| | | |
|---|---|---|
| CN | 108830892 A | 11/2018 |
| CN | 109376618 A | 2/2019 |
| CN | 109829930 A | 5/2019 |
| CN | 110047053 A | 7/2019 |
| CN | 110555796 A | 12/2019 |
| CN | 110992493 A | 4/2020 |
| CN | 111507890 A | 8/2020 |
| JP | 2018-531449 A | 10/2018 |
| KR | 2008-0106596 A | 12/2008 |
| KR | 2013-0120175 A | 11/2013 |
| KR | 2017-0047167 A | 5/2017 |
| KR | 2020-0017266 A | 2/2020 |

OTHER PUBLICATIONS https://www.douyin.com/video/6777994441564146955?previous_page=personal_homepage; Douyin; Jan. 2020; accessed Aug. 19, 2022; 10 pags.

European Patent Application No. 21788590.4; Extended Search Report; dated Sep. 12, 2023; 9 pages.

Korea Patent Application No. 10-2022-7038322; Office Action; dated Nov. 27, 2023; 10 pages.

Japan Patent Application No. 2022-561575; Office Action; dated Dec. 5, 2023; 4 pages.

\* cited by examiner

IMAGE PROCESSING METHOD AND APPARATUS, ELECTRONIC DEVICE, AND COMPUTER-READABLE STORAGE MEDIUM

CROSS-REFERENCE TO RELATED APPLICATION

This application is a continuation of International Application No. PCT/CN2021/085326, filed on Apr. 2, 2021, which claims priority to Chinese Patent Application CN 202010287393.4 filed with China National Intellectual Property Administration on Apr. 13, 2020, the entire disclosure of which are incorporated herein by reference.

FIELD

Embodiments of the present disclosure relate to the field of image processing technologies, and more particularly, to an image processing method and apparatus, an electronic device, and a computer-readable storage medium.

BACKGROUND

In recent years, with the development of smart terminal technologies, the number of applications that perform different processes on image information collected by smart terminals is becoming increasingly larger. These applications can process, e.g., beautify and add special effects to, the collected image information. For example, a special effect related to an image of an animal such as a rabbit, a cat, a piglet, etc., can be added to image information obtained after taking a picture or during taking a selfie. For another example, a special effect of a background change can be performed on the image information obtained after taking a picture or during taking a selfie.

SUMMARY

Embodiments of the present disclosure aim to solve at least one of the above-mentioned technical defects. The summary is provided to introduce concepts of the present disclosure in a brief form. These concepts will be described in detail in the following detailed description of embodiments. The summary is neither intended to identify key or essential features of the claimed technical solutions nor to limit the scope of the claimed technical solutions.

In an aspect, there is provided an image processing method including: when an obtained first image includes a human face, performing a first transformation process on the first image to obtain a second image; determining, based on a first target face key point of the human face in the first image, a target position, in the first image, of a second target face key point of the human face in the second image; performing a first movement process on the second image based on the target position; and generating a target image based on the first image and the second image processed through the first movement process, and displaying the target image.

In another aspect, there is provided an image processing apparatus including: a first processing module configured to perform a first transformation process on the first image to obtain a second image when an obtained first image includes a human face; a determining module configured to determine, based on a first target face key point of the human face in the first image, a target position, in the first image, of a second target face key point of the human face in the second image; a second processing module configured to perform a first movement process on the second image based on the target position; and a third processing module configured to generate a target image based on the first image and the second image processed through the first movement process, and display the target image.

In yet another aspect, there is provided an electronic device including a memory, a processor, and a computer program stored in the memory and executable on the processor. The processor, when executing the computer program, implements the image processing method described above.

In still yet another aspect, there is provided a non-transitory computer-readable storage medium having a computer program stored thereon. The computer program, when executed by a processor, implements the image processing method described above.

BRIEF DESCRIPTION OF DRAWINGS

The above and other features, advantages, and aspects of embodiments of the present disclosure will become more apparent in conjunction with the accompanying drawings and with reference to the following specific implementations. Throughout the accompanying drawings, same or similar elements are denoted by same or similar reference numerals. It should be understood that the accompanying drawings are illustrative, and components and elements are not necessarily illustrated to scale.

DESCRIPTION OF EMBODIMENTS

Embodiments of the present disclosure will be described in detail below with reference to the accompanying drawings. Although some embodiments of the present disclosure are illustrated in the drawings, it should be understood that the present disclosure may be implemented in various forms and should not be construed as being limited to the embodiments set forth herein. On the contrary, these embodiments are provided to facilitate a more complete and thorough understanding of the present disclosure. It should be understood that the accompanying drawings and embodiments of the present disclosure are merely exemplary, and are not intended to limit the scope of the present disclosure.

It should be understood that steps described in method implementations of the present disclosure may be executed in different sequences and/or in parallel. In addition, the method implementations may include additional steps and/or omit executions of the illustrated steps. The scope of the present disclosure is not limited in this regard.

The term "include," "including," or "includes" and its variants as used herein indicate open-ended inclusions, i.e., "includes but not limited to". The term "based on" refers to "at least partially based on". The term "one embodiment" means "at least one embodiment"; the term "another embodiment" means "at least one additional embodiment";

and the term "some embodiments" means "at least some embodiments". Associated definitions of other terms will be given in the following description.

It should be noted that concepts such as "first" and "second" mentioned in the present disclosure are only used to distinguish apparatuses, modules or units, and are neither used to limit that these apparatuses, modules or units are definitely different apparatuses, modules or units, nor used to limit a sequence or interdependence of functions performed by these apparatuses, modules or units.

It should be noted that modifications such as "a" and "plurality of" mentioned in the present disclosure are schematic, rather than being restrictive, and should be construed as "one or more" by those skilled in the art, unless otherwise clearly indicated in the context.

Names of messages or information exchanged between apparatuses in the embodiments of the present disclosure are only used for illustrative purposes, and are not intended to limit the scope of these messages or information.

In order to make the objects, technical solutions, and advantages of the embodiments of the present disclosure more apparent, the embodiments of the present disclosure will be described in detail below with reference to the accompanying drawings.

The technical solutions of the embodiments of the present disclosure and how the technical solutions of the embodiments of the present disclosure solve the above technical problems will be described in detail below with specific embodiments. The following several specific embodiments may be combined with each other, and the same or similar concepts or processes may not be repeated in some embodiments. The embodiments of the present disclosure will be described below with reference to the accompanying drawings.

In the related art, usually a form of a process of image information by an existing application is anything but diverse. Therefore, such a process can only meet basic requirements of users to a certain extent, bur cannot meet diversified requirements of users as their requirements increase.

Figure 1:
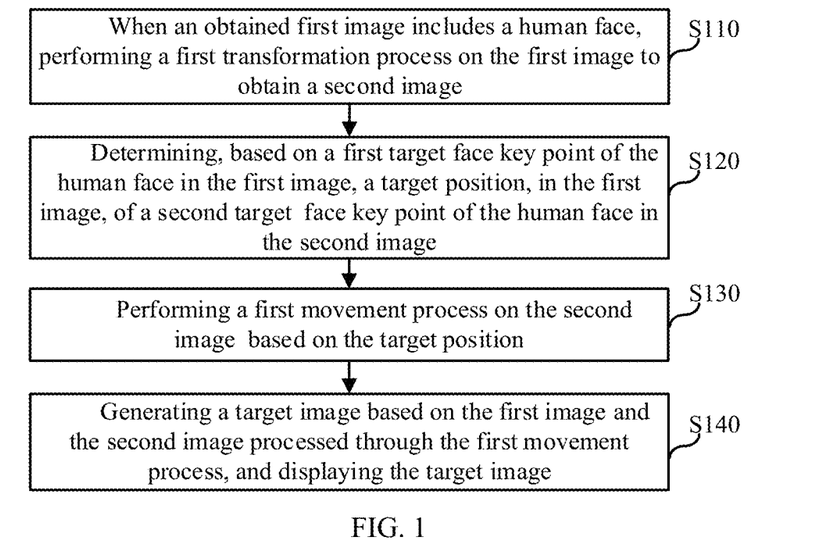
FIG. 1 is flowchart illustrating an image processing method according to an embodiment of the present disclosure.

According to an embodiment of the present disclosure, there is provided an image processing method. The method is executable by a terminal. The terminal may be a computer device including a desktop device, or a mobile terminal. As illustrated in FIG. 1, the method includes actions at blocks S110 to S140.

At block S110, a first transformation process is performed, when an obtained first image including a human face, on the first image to obtain a second image. At block S120, a target position, in the first image, of a second target face key point of the human face in the second image is determined based on a first target face key point of the human face in the first image. At block S130, a first movement process is performed, on the second image based on the target position. At block S140, a target image is generated based on the first image and the second image processed through the first movement process, and the target image is displayed.

Specifically, the terminal device may collect video information by means of a multimedia collection device (e.g., a camera, a camera lens, etc.) and extract a frame from the video information as an image to be processed (i.e., the first image), or may extract any image from a local pre-stored image set (e.g., an album) as the image to be processed (i.e., the first image). Of course, the image to be processed (i.e., the first image) may be obtained in other achievable manners, which are not limited by the embodiments of the present disclosure. Here, an operation of obtaining the first image may be to pre-select an image that needs to be processed before performing an image process, or to remind, after detecting that a user has triggered an image processing operation, the user to provide or upload the image that needs to be processed.

Specifically, the first image may be various images including people, animals, landscapes, articles, and the like. Here, when the first image includes a human face, a transformation process (i.e., the first transformation process) may be performed on the first image to obtain a first image (i.e., to obtain the second image) processed through the transformation process. In this case, the terminal device includes two images, one being the first image and the other being the second image. When no human face is included in the first image, the transformation process (i.e., the first transformation process) is not performed on the first image, and of course no second image is obtained.

Specifically, since the first image is an image including the human face, after obtaining the second image, the terminal device may determine a target position, in the first image, of a target face key point (i.e., the second target face key point) of the human face in the second image based on a target face key point (i.e., the first target face key point) of the human face in the first image, e.g., a face outline, an eye, an eyebrow, a lip, and a nose outline. In an example, it is possible to determine a position of the second image in the first image based on the target face key point of the human face in the first image. Here, the second target face key point may be a same face key point as the first target face key point, or a part of the first target face key point, or a different face key point from the first target face key point. The embodiments of the present disclosure are not limited thereto.

Specifically, after determining the target position, in the first image, of the second target face key point of the human face in the second image, a movement process (i.e., the first movement process) may be performed on the second image based on the target position to obtain the second image processed through the movement process. In an example, it is possible to perform the movement process on the entire second image by moving the second target face key point of the human face in the second image to the target position to obtain the second image processed through the movement process.

Specifically, after the second image processed through the movement process is obtained, the target image may be generated based on the first image and the second image processed through the first movement process. In this manner, the target image includes both image information of the first image and image information of the second image. In addition, the image information of the first image and the image information of the second image may be located at different image positions. The first image herein is an image to be processed (equivalent to an original image) obtained by the terminal device. In an example, the target image may be generated by performing a synthesis process (e.g., an image flattening processing or an image merging process) on the first image and the second image processed through the first movement process. In further another example, the first image may be regarded as one layer (e.g., Layer 1), and the second image processed through the first movement process may be regarded as another layer (e.g., Layer 2). The target image may be generated by performing a superimposing process on the one layer and the other layer. During the superimposing process, the Layer 1 may be regarded as a bottom layer and Layer 2 as a top layer, as desired.

With the image processing method according to the embodiment of the present disclosure, the first movement process is performed on the second image obtained through the first transformation process based on the first target face key point of the human face in the first image. The target image is generated based on the first image and the second image processed through the first movement process. In this way, not only the target image may include both the image information of the first image and the image information of the second image obtained by performing the first transformation process on the first image, but also the image information of the first image and the image information of the second image in the target image can be located at different image positions. Therefore, an image having a novel style of special effects can be provided to the user to satisfy the user's need for a variety of image variations, thereby effectively enhancing user experience and user satisfaction.

In a possible implementation, the second image may be obtained by performing the first transformation process on the first image in accordance with the following transformation processes. First, a feature transformation process is performed on respective first facial features of the human face in the first image to obtain respective second facial feature matching a human face of a predetermined age group, and an image of the human face containing the respective second facial features is determined as a third image. A cutout process is performed on the third image based on a predetermined portrait mask, and an image obtained through the cutout process is determined as the second image.

Generally, ages of people may be divided into different age groups, such as an infant age group from 0 to 1 year old, a toddler age group from 1 to 4 years old, a child age group from 5 to 11 years old, a teenager age group from 12 to 18 years old, a youth age group from 19 to 35 years old, a middle age group from 36 to 60 years old, the elderly age group over 60 years old, etc. Of course, the age groups may be divided in other ways, which are not limited to the embodiments of the present disclosure. The respective facial features of human faces tend to differ between age groups. For example, a face of an infant from 0 and 1 year old often has baby fat, and a face of an elderly person over 60 years old is wrinkled and saggy. The human face of the predetermined age group as described above may be a face of any pre-selected age group, e.g., a human face of the infant age group from 0 to 1 year old, or a human face of the youth age group from 19 to 35 years old, or a human face of the elderly age group over 60 years old, etc.

Specifically, during performing the first transformation process on the first image, the feature transformation process may be performed on respective first facial features of the human face in the first image to obtain the respective second facial features matching the human face of the predetermined age group, e.g., to obtain respective second facial features that correspond to respective facial features of a face of an infant, to obtain respective second facial features that correspond to respective facial features of a face of a youth, or to obtain respective second facial features that correspond to respective facial features of a face of an elderly person. After the respective second facial features matching the human face of the predetermined age group are obtained, the image of the human face containing the respective second facial features may be determined as the third image. The third image is an obtained image processed through the feature transformation process. That is, the feature transformation process is performed, based on the respective facial features (i.e., the respective second facial features) of the human face of the predetermined age group, on the respective facial features (i.e., respective first facial features) of the human face in the first image to obtain the first image processed through the feature transformation process (i.e., the third image as described above).

In practice, the feature transformation process may be performed, by a neural network (e.g., an adversarial neural network) trained on respective facial features of different age groups, on the respective facial features (i.e., respective first facial features) of the human face in the first image based on the respective facial features (i.e., the respective second facial features) of the human face of the predetermined age group.

In an example, when several (e.g., two) human faces, e.g., two human faces, namely Human Face 1 and Human Face 2, are included in the first image, a target human face may be determined and the feature transformation process may be performed on respective first facial features of the target human face. Assuming that the Human Face 1 is the target human face, the feature transformation process may be performed on respective first facial features of the Human Face 1 to obtain respective second facial features matching the human face of the predetermined age group, and an image of the Human Face 1 containing the respective second facial features may be determined as the third image. Of course, the third image may include the Human Face 2 or other relevant images in addition to the image of the Human Face 1 containing the respective second facial features, and the embodiment of the present disclosure is not limited thereto.

Specifically, after the third image is obtained, to better perform a subsequent process on a target object, including the human face, in the third image, the cutout process may be performed, based on the predetermined portrait mask, on the third image to cut out the target object including the human face from the third image, and an image obtained through the cutout process (i.e., an image of the target object including the human face) is determined as the second image. That is, the second image is the image of the target object including the human face and cut out, based on the predetermined portrait mask, from the third image. Assuming that several human faces, e.g., two human faces, namely Human Face 1 and Human Face 2 are included in the third image, and Person 1 including the Human Face 1 is the target object, the cutout process may be performed, based on the predetermined portrait mask, on the third image to cut out the target object including the human face (i.e., the Person 1 including the Human Face 1) from the third image, and the cut-out image is determined as the second image.

In a possible implementation, prior to performing the first movement process on the second image based on the target position, additional information corresponding to the facial feature may be added to the second image. After the additional information corresponding to the facial feature is added to the second image, the first movement process may be performed on the second image added with the additional information corresponding to the facial feature.

Specifically, the additional information corresponding to the facial feature may be various styles of hats, hair ornaments, earrings, glasses, etc., or other additional information corresponding to the facial feature and having animation effects, e.g., additional information related to animals such as rabbits, cats, piglets, puppies, etc., additional information that has a funny or spoof effect, additional information about "tears" associated with an expression "crying", or other additional information related to being cute, etc., to name a few. Adding the additional information corresponding to the facial feature to the second image can make the human face in the second image more vivid, and improve the interest to a certain extent, thereby satisfying personalized requirements of the user.

In an example, it is supposed that the human face of the predetermined age group is the face of the infant age group from 0 to 1 year old. That is, the second image includes a human face (e.g., Human Face 3) having respective second facial features that correspond to respective facial features of the face of the infant. In this case, in order to make the Human Face 3 more vivid, some decorative items corresponding to the infant, such as a baby hat, a baby hairpiece, etc., may be added to the Human Face 3 in the second image.

Specifically, after the additional information corresponding to the facial feature is added to the second image, the first movement process may also be performed on the added additional information corresponding to the facial feature during the first movement process of the second image. That is, the first movement process is performed on the second image added with the additional information corresponding to the facial feature.

In a possible implementation, the first target face key point includes a 44-th face key point and a 16-th face key point of 106 face key points, and the second target face key point is the 44-th face key point of the 106 face key points. Here, during determining, based on the first target face key point of the human face in the first image, the target position, in the first image, of the second target face key point of the human face in the second image, the following process may be performed. First, a direction vector from the 44-th face key point to the 16-th face key point of the human face in the first image is determined. A first position point is obtained based on a predetermined displacement factor, the direction vector, and the 16-th face key point of the human face in the first image in accordance with a first predetermined calculation formula, and the first position point is determined as a target position, in the first image, of the 44-th face key point of the human face in the second image.

Specifically, the 44-th face key point and the 16-th face key point of the human face in the first image may be determined based on the current 106 face key points, and the 44-th face key point and the 16-th face key point may be determined as the first target face key point of the human face in the first image. Among the 106 face key points, the 44-th face key point is located at the bridge of the nose, and the 16-th face key point is located at the chin. Further, after the 44-th face key point and the 16-th face key point are determined, the direction vector from the 44-th face key point (i.e., point P0) to the 16-th face key point (i.e., point P1) may be determined. For the convenience of description, the 44-th face key point may be denoted as P0 and the 16-th face key point as P1. In this case, determining the direction vector from the 44-th face key point (i.e., the point P0) to the 16-th face key point (i.e., the point P1) is to determine a two-dimensional direction vector, which may be denoted as P01, from point P0 to point P1. That is, P01=P1−P0.

Specifically, after the direction vector (i.e., P01) is determined, the first position point may be obtained based on the predetermined displacement factor, the direction vector P01, and the 16-th face key point (i.e., the point P1) of the human face in the first image in accordance with the first predetermined calculation formula. In practice, a position point P2 (i.e., the first position point) may be obtained by superimposing, from point P1, a vector of K times P01 in a direction of the direction vector P01. The first predetermined calculation formula may be described as: P2=(P1−P0)*K+P1, where (P1−P0) is the two-dimensional direction vector from the point P0 to the point P1, K is the predetermined displacement factor, and P1 is the 16-th face key point of the human face in the first image. In an example, a value of K is 1. When the value of K is 1, the first position point P2 is located approximately at a position of the chin, facing towards a lower half of the human face, of the human face in the first image.

Specifically, after the first position point is determined, the first position point is determined as the target position, in the first image, of the 44-th face key point of the human face in the second image. That is, the 44-th face key point of the human face in the second image is moved to the first position point P2 in the first image. That is, the first position point P2 in the first image is determined as a fixed anchor point for the 44-th face key point of the human face in the second image. This is equivalent to moving the entire second image as a whole by moving the 44-th face key point of the human face in the second image to the first position point P2 in the first image.

Specifically, during performing the first movement process on the second image based on the target position, the following process may be performed. First, a zoom-out process is performed on the second image taking the 44-th face key point of the human face in the first image as a face center point based on a predetermined zoom-out factor, to obtain a fourth image. A translation process is performed on the fourth image based on the target position.

Specifically, after the second image is obtained by performing the first transformation process on the first image, the image information of the second image overlaps with the image information of the first image, except that the respective facial features (i.e., the respective second facial features) of the human face in the second image are slightly different from the respective facial features (i.e., the respective first facial features) of the human face in the first image. That is, in this case, two images are obtained by the terminal device, one being the first image of the human face containing the respective first facial features, and the other being the second image of the human face containing the respective second facial features. Image information (or image features) of those two images overlaps with each other. Here, the term "overlap" means that positions of the image information (or the image features) in the two images overlap with each other. For example, positions of eyes of the human face in the first image overlap with positions of eyes of the human face in the second image. In addition, for example, a position of a mouth of the human face in the first image overlaps with a position of a mouth of the human face in the second image, or the like.

Of course, when the additional information corresponding to the facial feature is added to the second image, the image information of the second image overlaps with the image information of the first image in addition to the additional information corresponding to the facial feature in the second image.

In an example, during performing the first movement process on the second image based on the target position, since the image information of the first image overlaps with the image information of the second image, the 44-th face key point of the human face in the first image overlaps with the 44-th face key point of the human face in the second image. On this basis, the 44-th face key point of the human face in the second image may be first moved to the 44-th face key point of the human face in the first image. That is, the second image overlaps with the first image by using the 44-th face key point as an anchor point. The zoom-out process is performed on the entire second image by the predetermined zoom-out factor by using the 44-th face key point of the human face in the second image as the anchor point, to obtain the second image (i.e., the fourth image) processed through the zoom-out process. The translation process is performed on the fourth image based on the target position. Since the target position is a position, in the first image, of the 44-th face key point of the human face in the second image, performing the translation process on the fourth image based on the target position is equivalent to performing the translation process on the entire fourth image by moving the 44-th face key point of the human face in the fourth image to the target position. That is, the 44-th face key point of the fourth image processed through the translation process is located at the target position.

In this example, during performing the translation process on the fourth image based on the target position, first, a mask of a suitable size (e.g., a T-shaped mask) may be determined based on the target position and a size of the fourth image. The mask is covered at a suitable position in the first image based on the target position. Translating the fourth image onto the mask based on the target position is equivalent to drawing the second image into the first image. Here, during drawing the second image into the first image, it is ensured that the 44-th face key point of the human face in the second image is located at the target position.

Further, in this example, performing the first movement process on the second image based on the target position is equivalent to first performing the zoom-out process on the second image by a factor of S with respect to P0 as a center, and then performing the translation process on the second image. Each pixel P in the second image is moved by a position P' in accordance with the following formula (1):

$$P'=P*S+(P2-P0*S) \quad (1)$$

where P is two-dimensional data representing coordinates of a position of each pixel of the second image in a screen space of the terminal device. The screen space of the terminal device is a coordinate space normalized to 0 to 1. That is, P is a coordinate ranging from 0 to 1. P2=(P1−P0)*K+P1. Reference may be made to the above description for details.

In another example, during performing the first movement process on the second image based on the target position, first, P2 in the first image may be determined as the 44-th face key point of the human face in the second image. That is, the entire second image may be translated by translating the 44-th face key point of the human face in the second image to P2. That is, the entire second image may be moved to a corresponding position by using P2 as a fixed anchor point for the 44-th human face key of the human face in the second image. The zoom-out process is performed on the second image by the predetermined zoom-out factor based on the fixed anchor point, to obtain the second image processed through the first movement process. An implementation process of this example is similar to that of the above example, and thus details thereof will be omitted herein.

Specifically, subsequent to performing the first movement process on the second image based on the target position, target additional information may be added to a predetermined position of the second image processed through the first movement process, to obtain a fifth image. Here, generating the target image based on the first image and the second image processed through the first movement process includes generating the target image based on the first image and the fifth image.

Specifically, after the second image processed through the first movement process is obtained, in order to cover a part of the image information that is not expected to be displayed, or in order to increase the interest of the image, the target additional information may be added to the predetermined position of the second image processed through the first movement process. The target additional information may be various decorative items matching the predetermined age group. For example, when the predetermined age group is the infant age group, the target additional information may be a pair of overalls, a carrier with a hip seat, or the like, and when the predetermined age group is the elderly age group, the target additional information may be a wheelchair, a cane, or the like. Of course, the target additional information may also be other specific decorative items selected as desired, and the embodiment of the present disclosure is not limited thereto. Here, the predetermined position may be a body part below the human face or other body parts, and the embodiment of the present disclosure is not limited thereto.

Figure 2:
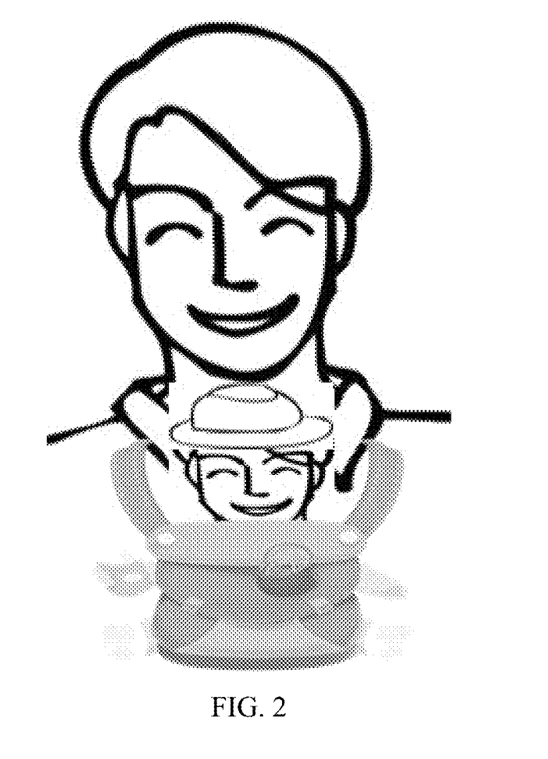
FIG. 2 is a schematic view showing a target image according to an embodiment of the present disclosure.

Specifically, after the target additional information is added to the predetermined position of the second image processed through the first movement process, the target image is in fact generated based on the first image and the second image added with the target additional information. For the convenience of description, the image obtained by adding the target additional information to the predetermined position of the second image processed through the first movement process may be denoted as the fifth image. That is, the target image is generated based on the first image and the fifth image. Here, FIG. 2 illustrates a schematic view of the target image according to an embodiment of the present disclosure.

In a possible implementation, subsequent to performing the first movement process on the second image based on the target position, the following process may be performed. A second movement process is performed on the second image processed through the first movement process based on a predetermined movement trajectory, to move the fourth image processed through the translation process along the predetermined movement trajectory. Here, generating the target image based on the first image and the second image processed through the first movement process may specifically include generating the target image based on the first image and the second image processed through the second movement process.

Specifically, during performing the second movement process on the second image processed through the first movement process based on the predetermined movement trajectory, the following process may be performed. First, a time difference between a current time point and a movement start time point of the predetermined movement trajectory is determined. A target displacement and a target rotation angle that correspond to the current time point are determined from a predetermined movement set based on the time difference. The predetermined movement set includes displacements and rotation angles of the predetermined movement trajectory at a plurality of predetermined time points. A movement position of the second image processed through the first movement process at the current time point is determined based on the target displacement and the target rotation angle, and the second image processed through the first movement process is determined to move continuously along the predetermined movement trajectory by taking the movement position as a movement start position.

Specifically, in order to further increase the interest of the image to make the special effect more vivid, the second movement process may be performed on the second image processed through the first movement process (i.e., the fourth image processed through the translation process) based on the predetermined movement trajectory, which is equivalent to adding the predetermined movement trajectory to the fourth image processed through the translation process, to move the fourth image along the predetermined movement trajectory. Here, the predetermined movement trajectory may be a movement trajectory shakable in an upward direction, a downward direction, a leftward direction, and a rightward direction. When the predetermined movement trajectory is the movement trajectory shakable in the upward direction, the downward direction, the leftward direction, and the rightward direction, it is equivalent to adding a predetermined movement shakable in the upward direction, the downward direction, the leftward direction, and the rightward direction to the second image processed through the first movement process. When the target additional information has already been added to the second image processed through the first movement process in this case, the second image processed through the first movement process is moved based on the predetermined movement trajectory together with the target additional information.

Specifically, performing the second movement process on the fourth image processed through the translation process based on the predetermined movement trajectory is equivalent to performing the second movement process on the fourth image processed through the translation process based on the predetermined movement trajectory, to obtain the fourth image processed through the second movement process. After the fourth image processed through the second movement process is obtained, the target image may be generated based on the first image and the second image processed through the second movement process.

Typically, the predetermined movement trajectory has different displacements and rotation angles at different time points, and is carried out repeatedly. Therefore, displacements and rotation angles of the predetermined movement trajectory at a plurality of predetermined time points within a movement cycle can be stored by means of a piece of movement data (i.e., predetermined movement data). Here, displacements and rotation angles are same to each other for different movement cycles at same predetermined time points within different movement cycles. For example, a displacement at a predetermined time point T1_1 within a movement cycle 1 is same as a displacement at a predetermined time point T2_1 within a movement cycle 2, and a rotation angle at the predetermined time point T1_1 within the movement cycle 1 is same as a rotation angle at the predetermined time point T2_1 within the movement cycle 2.

Specifically, since different movement time points correspond to different positions of the predetermined movement trajectory, i.e., different movement time points correspond to different displacements and rotation angles, a displacement (i.e., the target displacement) and a rotation angle (i.e., the target rotation angle) that correspond to the current time point need to be determined based on the current time point when the predetermined movement trajectory is added to the fourth image processed through the translation process. Here, the displacement and the rotation angle that correspond to the current time point may be determined based on the time difference between the current time point and the movement start time point of the predetermined movement trajectory. When determining the displacement and the rotation angle that correspond to the current time point based on the time difference, a corresponding displacement and rotation angle may be selected, from the predetermined movement set based on the time difference. The selected displacement may be determined as the target displacement for the current time point and the selected rotation angle as the target rotation angle for the current time point.

Specifically, after the target displacement and the target rotation angle are determined, a position in the predetermined movement trajectory at the current time point may be determined based on the target displacement and the target rotation angle. A continuous movement is performed along the predetermined movement trajectory by taking the position as the movement start position.

In an example, assuming that the current time point is T_current and the movement start time point of the predetermined movement trajectory is T start. First, the time difference may be calculated by deducting T start from T_current. After the time difference is obtained, a corresponding displacement T and rotation angle D may be selected from displacements and rotation angles stored in the predetermined movement set based on the time difference. That is, the displacement T is the target displacement at the current time point, and the rotation angle D is the target rotation angle at the current time point. The movement position of the fourth image processed through the translation process at the current time point is determined based on the target displacement and the target rotation angle, and the fourth image processed through the translation process moves continuously along the predetermined movement trajectory by taking the movement position as the movement start position.

In this example, performing the second movement process on the fourth image processed through the translation process based on the predetermined movement trajectory is equivalent to adding a predetermined P2-based displacement and rotation to formula (1). A formula added with the displacement and rotation angle may be described as formula (2):

$$P'=M*((P-P0)*S)+P0*S+(P2-P0*S)+T \quad (2)$$

where M is a two-dimensional rotation matrix obtained using the rotation angle D, $$M = \begin{bmatrix} \sin D & \cos D \\ -\cos D & \sin D \end{bmatrix},$$

and T is the displacement.

It should be noted that the above formula (1) may be applied when only the first movement process is performed on the second image. When both the first movement process on the second image and the second movement process on the second image processed through the first movement process are to be performed, the above formula (2) may be directly applied, without applying formula (1).

Figure 3:
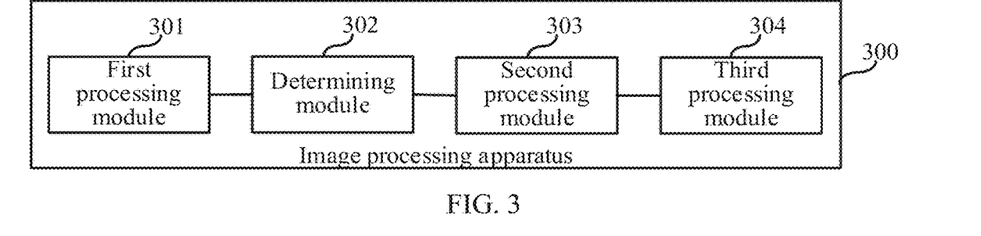
FIG. 3 is a block diagram illustrating a basic structure of an image processing apparatus according to an embodiment of the disclosure.

FIG. 3 is a block diagram showing a structure of an image processing apparatus according to another embodiment of the disclosure. As illustrated in FIG. 3, an apparatus 300 may include a first processing module 301, a determining module 302, a second processing module 303, and a third processing module 304.

The first processing module 301 is configured to perform a first transformation process on a first image when an obtained first image includes a human face, to obtain a second image. The determining module 302 is configured to determine a target position, in the first image, of a second target face key point of the human face in the second image based on a first target face key point of the human face in the first image. The second processing module 303 is configured to perform a first movement process on the second image based on the target position. The third processing module 304 is configured to generate a target image based on the first image and the second image processed through the first movement process, and to display the target image.

In a possible implementation, the first processing module is configured to: perform a feature transformation process on respective first facial features of the human face in the first image to obtain respective second facial features matching a human face of a predetermined age group, and determine an image of a human face containing the respective second facial features as a third image; and perform a cutout process on the third image based on a predetermined portrait mask, and determine an image obtained through the cutout process as the second image.

In a possible implementation, a first addition module is also included. The first addition module is configured to add additional information corresponding to a facial feature to the second image. The second processing module is configured to perform the first movement process on the second image added with the additional information corresponding to the facial feature.

In a possible implementation, a first target face key point includes a 44-th face key point and a 16-th face key point of 106 face key points, and the second target face key point is the 44-th face key point of the 106 face key points. The determining module is specifically configured to: determine a direction vector from the 44-th face key point to the 16-th face key point of the human face in the first image; and obtain a first position point based on a predetermined displacement factor, the direction vector, and the 16-th face key point of the human face in the first image in accordance with a first predetermined calculation formula, and determine the first position point as a target position, in the first image, of the 44-th face key point of the human face in the second image.

In a possible implementation, the second processing module is configured to: perform a zoom-out process on the second image taking the 44-th face key point of the human face in the first image as a face center point based on a predetermined zoom-out factor to obtain a fourth image; and perform a translation process on the fourth image based on the target position.

In a possible implementation, a second addition module is also included. The second addition module is configured to add target additional information to a predetermined position of the second image processed through the first movement process to obtain a fifth image. The third processing module is configured to generate the target image based on the first image and the fifth image when generating the target image based on the first image and the second image processed through the first movement process.

In a possible implementation, a fourth processing module is also included. The fourth processing module is configured to perform a second movement process on the second image processed through the first movement process based on a predetermined movement trajectory to move the fourth image processed through the translation process along the predetermined movement trajectory. Here, the third processing module is configured to generate the target image based on the first image and the second image processed through the second movement process when generating the target image based on the first image and the second image processed through the first movement process.

In a possible implementation, the fourth processing module is specifically configured to: determine a time difference between a current time point and a movement start time point of the predetermined movement trajectory; determine a target displacement and a target rotation angle that correspond to the current time point from a predetermined movement set based on the time difference, in which the predetermined movement set includes displacements and rotation angles of the predetermined movement trajectory at a plurality of predetermined time points; and determine a movement position of the second image processed through the first movement process at the current time point based on the target displacement and the target rotation angle, and determine that the second image processed through the first movement process continuously moves along the predetermined movement trajectory by taking the movement position as a movement start position.

With the image processing apparatus according to embodiments of the present disclosure, the first movement process is performed on the second image obtained by the first transformation process based on the first target face key point of the human face in the first image. The target image is generated based on the first image and the second image processed through the first movement process. In this way, not only the target image may include both the image information of the first image and the image information of the second image obtained by performing the first transformation process on the first image, but also the image information of the first image and the image information of the second image in the target image may be located at different image positions. Therefore, an image having a novel style of special effects can be provided to the user to satisfy the user's need for a variety of image variations, thereby effectively enhancing user experience and user satisfaction.

It should be noted that this embodiment is an apparatus embodiment corresponding to any of the method embodiments as described above, and can be implemented in conjunction with the method embodiments described above. Technical details mentioned in the method embodiments above are still valid in this embodiment. Details thereof will be omitted herein for the sake of simplicity. Accordingly, relevant technical details mentioned in this embodiment can also be applied to the method embodiments described above.

Figure 4:
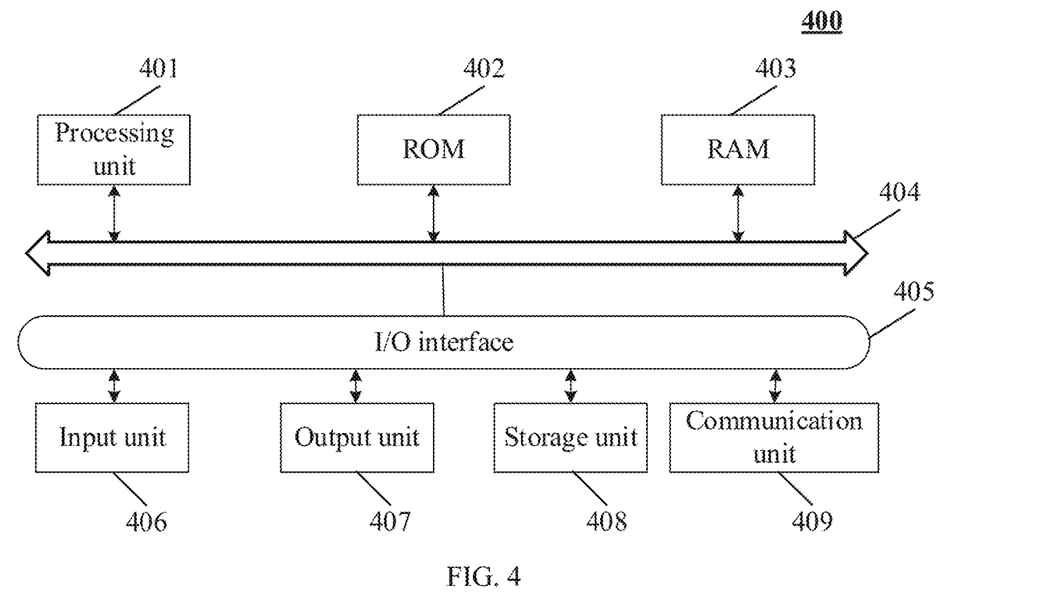
FIG. 4 is a block diagram illustrating a structure of an electronic device according to an embodiment of the disclosure.

Reference is now made to FIG. 4, which is a schematic diagram showing a structure of an electronic device 400 adapted to implement the embodiments of the present disclosure. The terminal device according to the embodiments of the present disclosure may include, but are not limited to, a mobile terminal such as a mobile phone, a laptop computer, a digital broadcast receiver, a Personal Digital Assistant (PDA), a tablet computer or PAD, a Portable Multimedia Player (PMP), an on-vehicle terminal (e.g., an on-vehicle navigation terminal), etc., and a fixed terminal such as a digital TV, a desktop computer, etc. The electronic device illustrated in FIG. 4 is exemplary only, and should not be construed as limiting the function and use range of the embodiments of the present disclosure.

The electronic device includes a memory and a processor. The processor may be referred to as a processing unit 401 described below, and the memory may include at least one of a Read Only Memory (ROM) 402, a Random Access Memory (RAM) 403, or a storage unit 408 that are described below. Specific details are described below.

As illustrated in FIG. 4, the electronic device 400 may include a processing unit (such as a central processing unit, a graphics processing unit, etc.) 401, which may perform various appropriate actions and processing in accordance with programs stored in the ROM 402 or loaded from a storage unit 408 into the RAM 403. Various programs and data required for operation of the electronic device 400 may also be stored in the RAM 403. The processing unit 401, the ROM 402, and the RAM 403 are connected to each other through a bus 404. An Input/Output (I/O) interface 405 is also connected to the bus 404.

Generally, the following units may be connected to the I/O interface 405: an input unit 406 including, for example, a touch screen, a touch pad, a keyboard, a mouse, a camera, a microphone, an accelerometer, a gyroscope, etc.; an output unit 407 including, for example, a Liquid Crystal Display (LCD), a speaker, an oscillator, etc.; the storage unit 408 including, for example, a magnetic tape or a hard disk; and a communication unit 409. The communication unit 409 may allow the electronic device 400 to perform wireless or wired communication with other devices for data exchange. Although FIG. 4 illustrates the electronic device 400 having various units, it should be appreciated that it is not necessary to implement or provide all the illustrated units. Alternatively, more or fewer units may be implemented or provided.

In particular, according to embodiments of the present disclosure, the above processes described with reference to the flowcharts may be implemented as computer software programs. For example, embodiments of the present disclosure include a computer program product, which includes a computer program carried on a computer-readable medium. The computer program contains program codes for implementing the method illustrated in the flowcharts. In these embodiments, the computer program may be downloaded and installed from a network through the communication unit 409, or installed from the storage unit 408, or installed from the ROM 402. When the computer program is executed by the processing unit 401, the above-mentioned functions defined in the methods according to the embodiments of the present disclosure are performed.

It should be noted that the above computer-readable medium in the present disclosure may be a computer-readable signal medium, a computer-readable storage medium, or any combination thereof. The computer-readable storage medium may be, but not limited to, for example, an electrical, magnetic, optical, electromagnetic, infrared, or semiconductor system, apparatus, device, or any combination thereof. More specific examples of the computer-readable storage medium may include, but are not limited to: an electrical connection having one or more wires, a portable computer disk, a hard disk, a Random-Access Memory (RAM), a Read-Only Memory (ROM), an Erasable Programmable Read Only Memory (EPROM or a flash memory), an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier and carrying computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, and may transmit, propagate, or transfer programs used by or used with an instruction execution system, apparatus or device. The program codes contained on the computer-readable medium may be transferred via any appropriate medium, including but not limited to an electric cable, an optical cable, Radio Frequency (RF), or any suitable combination thereof.

The above computer-readable medium may be included in the above electronic device, or may be present independently without being assembled into the electronic device.

The above computer-readable medium may carry one or more programs which, when executed by the electronic device, allows the electronic device to: perform a first transformation process on the first image to obtain a second image when an obtained first image includes a human face; determine a target position, in the first image, of a second target face key point of the human face in the second image based on a first target face key point of the human face in the first image; perform a first movement process on the second image based on the target position; and generate a target image based on the first image and the second image processed through the first movement process, and display the target image.

The computer program codes for implementing the operations according to the present disclosure may be written in one or more programming languages or any combination thereof. The programming languages may include object-oriented programming languages, such as Java, Smalltalk, or C++, as well as conventional procedural programming languages, such as "C" language or similar programming languages. The program codes may be executed completely on a user computer, partly on the user computer, as a standalone software package, partly on the user computer and partly on a remote computer, or completely on a remote computer or a server. In a case where the remote computer is involved, the remote computer may be connected to the user computer through any types of networks, including a Local Area Network (LAN) or a Wide Area Network (WAN), or to an external computer (e.g., over the Internet by using an Internet service provider).

The flowcharts and block diagrams in the accompanying drawings illustrate architectures, functions, and operations of possible implementations of systems, methods and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It should also be noted that, in some alternative implementations, functions showed in blocks may occur in a different order from the order shown in the accompanying drawings. For example, two blocks illustrated in succession may actually be executed substantially in parallel with each other, or sometimes even in a reverse order, depending on functions involved. It should also be noted that each block in the block diagrams and/or flowcharts, or any combination of the blocks in the block diagrams and/or flowcharts, may be implemented by using a dedicated hardware-based system that is configured to perform specified functions or operations or by using a combination of dedicated hardware and computer instructions.

Modules or units involved and described in the embodiments of the present disclosure can be implemented in software or hardware. Here, a name of a module or a unit does not constitute a limitation on the module or the unit itself under certain circumstances. For example, an obtaining module may also be described as "a module for obtaining at least one event handling manner corresponding to a predetermined live event when the predetermined live event is detected".

The functions described above may be performed, at least in part, by one or more hardware logic components. For example, without limitation, exemplary types of hardware logic components include a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In the context of this disclosure, the machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of a machine-readable storage medium include an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read Only Memory (CD-ROM), an optical memory device, a magnetic memory device, or any suitable combination thereof.

According to one or more embodiments of the present disclosure, there is provided an image processing method including: when an obtained first image includes a human face, performing a first transformation process on the first image to obtain a second image; determining a target position, in the first image, of a second target face key point of the human face in the second image based on a first target face key point of the human face in the first image; performing a first movement process on the second image based on the target position; and generating a target image based on the first image and the second image processed through the first movement process, and displaying the target image.

In a possible implementation, performing the first transformation process on the first image to obtain the second image includes: performing a feature transformation process on respective first facial features of the human face in the first image to obtain respective second facial features matching a human face of a predetermined age group, and determining an image of a human face containing the respective second facial features as a third image; and performing a cutout process on the third image based on a predetermined portrait mask, and determining an image obtained through the cutout process as the second image.

In a possible implementation, the method also includes: prior to the performing the first movement process on the second image based on the target position, adding additional information corresponding to a facial feature to the second image. Performing the first movement process on the second image includes performing the first movement process on the second image added with the additional information corresponding to the facial feature.

In a possible implementation, the first target face key point includes a 44-th face key point and a 16-th face key point of 106 face key points, and the second target face key point is the 44-th face key point of the 106 face key points. The determining the target position, in the first image, of the second target face key point of the human face in the second image based on the first target face key point of the human face in the first image includes: determining a direction vector from the 44-th face key point to the 16-th face key point of the human face in the first image; and obtaining a first position point based on in accordance with a predetermined displacement factor, the direction vector, and the 16-th face key point of the human face in the first image in accordance with a first predetermined calculation formula; and determining the first position point as a target position, in the first image, of the 44-th face key point of the human face in the second image.

In a possible implementation, performing the first movement process on the second image based on the target position includes: performing a zoom-out process on the second image taking the 44-th face key point of the human face in the first image as a face center point based on a predetermined zoom-out factor to obtain a fourth image; and performing a translation process on the fourth image based on the target position.

In a possible implementation, the method also includes, subsequent to performing the first movement process on the second image based on the target position: adding target additional information to a predetermined position of the second image processed through the first movement process to obtain a fifth image. Generating the target image based on the first image and the second image processed through the first movement process includes generating the target image based on the first image and the fifth image.

In a possible implementation, the method also includes, subsequent to performing the first movement process on the second image based on the target position: performing a second movement process on the second image processed through the first movement process based on a predetermined movement trajectory to move the fourth image processed through the translation process along the predetermined movement trajectory. Generating the target image based on the first image and the second image processed through the first movement process includes generating the target image based on the first image and the second image processed through the second movement process.

In a possible implementation, performing the second movement process on the second image processed through the first movement process based on the predetermined movement trajectory includes: determining a time difference between a current time point and a movement start time point of the predetermined movement trajectory; determining a target displacement and a target rotation angle that correspond to the current time point from a predetermined movement set based on the time difference, in which the predetermined movement set includes displacements and rotation angles of the predetermined movement trajectory at a plurality of predetermined time points; and determining a movement position of the second image processed through the first movement process at the current time point based on the target displacement and the target rotation angle, and determining that the second image processed through the first movement process continuously moves along the predetermined movement trajectory by taking the movement position as a movement start position.

According to one or more embodiments of the present disclosure, there is provided an image processing apparatus including: a first processing module configured to perform a first transformation process on the first image to obtain a second image when an obtained first image includes a human face; a determining module configured to determine a target position, in the first image, of a second target face key point of a human face in the second image based on a first target face key point of the human face in the first image; a second processing module configured to perform a first movement process on the second image based on the target position; and a third processing module configured to generate a target image based on the first image and the second image processed through the first movement process, and display the target image.

In a possible implementation, the first processing module is configured to: perform a feature transformation process on respective first facial features of the human face in the first image to obtain respective second facial features matching a human face of a predetermined age group, and determine an image of a human face containing the respective second facial features as a third image; and perform a cutout process on the third image based on a predetermined portrait mask, and determine an image obtained through the cutout process as the second image.

In a possible implementation, a first addition module is also included. The first addition module is configured to add additional information corresponding to a facial feature to the second image. The second processing module is further configured to perform the first movement process on the second image added with the additional information corresponding to the facial feature.

In a possible implementation, the first target face key point includes a 44-th face key point and a 16-th face key point of 106 face key points, and the second target face key point is the 44-th face key point of the 106 face key points. The determining module is specifically configured to: determine a direction vector from the 44-th face key point to the 16-th face key point of the human face in the first image, obtain a first position point based on a predetermined displacement factor, the direction vector, and the 16-th face key point of the human face in the first image in accordance with a first predetermined calculation formula, and determine the first position point as a target position, in the first image, of the 44-th face key point of the human face in the second image.

In a possible implementation, the second processing module is further configured to: perform a zoom-out process on the second image taking the 44-th face key point of the human face in the first image as a face center point based on a predetermined zoom-out factor to obtain a fourth image, and perform a translation process on the fourth image based on the target position.

In a possible implementation, a second addition module is also included. The second addition module is configured to add target additional information to a predetermined position of the second image processed through the first movement process to obtain a fifth image. The third processing module is further configured to generate the target image based on the first image and the fifth image when generating the target image based on the first image and the second image processed through the first movement process.

In a possible implementation, a fourth processing module is also included. The fourth processing module is configured to perform a second movement process on the second image processed through the first movement process based on a predetermined movement trajectory to move the fourth image processed through the translation process along the predetermined movement trajectory. Here, the third processing module is further configured to generate the target image based on the first image and the second image processed through the second movement process when generating the target image based on the first image and the second image processed through the first movement process.

In a possible implementation, the fourth processing module is specifically configured to: determine a time difference between a current time point and a movement start time point of the predetermined movement trajectory; determine a target displacement and a target rotation angle that correspond to the current time point from a predetermined movement set based on the time difference, in which the predetermined movement set includes displacements and rotation angles of the predetermined movement trajectory at a plurality of predetermined time points; and determine a movement position of the second image processed through the first movement process at the current time point based on the target displacement and the target rotation angle, and determine that the second image processed through the first movement process continuously moves along the predetermined movement trajectory by taking the movement position as a movement start position.

The above description is merely intended to explain the preferred embodiments of the present disclosure and the employed principles of technology. It will be appreciated by those skilled in the art that the scope of the present disclosure herein is not limited to the technical solutions formed by the specific combinations of the above technical features, and should also encompass other technical solutions formed by any other combinations of features described above or equivalents thereof without departing from the above ideas of the present disclosure. For example, the above features and the technical features disclosed in the present disclosure having similar functions (but not limited thereto) are replaced with each other to form the technical solution.

Further, although the operations are depicted in a specific order, this should not be understood as requiring these operations to be performed in the specific order illustrated or in a sequential order. Under certain circumstances, multi-tasking and parallel process may be advantageous. Likewise, although several specific implementation details are included in the above discussion, these should not be construed as limitations on the scope of the present disclosure. Certain features that are described in the context of separate embodiments can also be implemented in combination in a single embodiment. Conversely, various features described in the context of a single embodiment can also be implemented in multiple embodiments separately or in any suitable combination.

Although the subject matter has been described in language specific to structural features and/or logical actions of method, it should be understood that the subject matter defined in the appended claims is not necessarily limited to the specific features or actions described above. On the contrary, the specific features and actions described above are merely exemplary forms of implementing the claims.

What is claimed is:
1. An image processing method, comprising:
when an obtained first image comprises a human face, performing a first transformation process on the first image to obtain a second image;
determining, based on a first target face key point of the human face in the first image, a target position, in the first image, of a second target face key point of the human face in the second image;
performing a first movement process on the second image based on the target position;
generating a target image based on the first image and the second image processed through the first movement process, and displaying the target image;
wherein the image processing method further comprises:

subsequent to the performing a first movement process on the second image based on the target position, performing a second movement process on the second image processed through the first movement process based on a predetermined movement trajectory;

wherein the generating a target image further comprises generating the target image based on the first image and the second image processed through the first movement process and the second movement process;

wherein the image processing method further comprises: subsequent to the performing the first movement process on the second image based on the target position, adding target additional information to a predetermined position of the second image processed through the first movement process to obtain a fifth image; and wherein the generating the target image based on the first image and the second image processed through the first movement process further comprises: generating the target image based on the first image and the fifth image.

2. The method according to claim 1, wherein said performing the first transformation process on the first image to obtain the second image comprises:

performing a feature transformation process on respective first facial features of the human face in the first image to obtain respective second facial features matching a human face of a predetermined age group, and determining an image of a human face containing the respective second facial features as a third image; and performing a cutout process on the third image based on a predetermined portrait mask, and determining an image obtained through the cutout process as the second image.

3. The method according to claim 1, further comprising, prior to said performing the first movement process on the second image based on the target position:

adding additional information corresponding to a facial feature to the second image, wherein said performing the first movement process on the second image comprises: performing the first movement process on the second image added with the additional information corresponding to the facial feature.

4. The method according to claim 1, wherein:

the first target face key point comprises a 44-th face key point and a 16-th face key point of 106 face key points, and the second target face key point is the 44-th face key point of the 106 face key points; and said determining, based on the first target face key point of the human face in the first image, the target position, in the first image, of the second target face key point of the human face in the second image comprises:

determining a direction vector from the 44-th face key point to the 16-th face key point of the human face in the first image; and obtaining a first position point based on a predetermined displacement factor, the direction vector and the 16-th face key point of the human face in the first image in accordance with a first predetermined calculation formula, and determining the first position point as a target position, in the first image, of the 44-th face key point of the human face in the second image.

5. The method according to claim 4, wherein said performing the first movement process on the second image based on the target position comprises:

performing, based on a predetermined zoom-out factor, a zoom-out process on the second image taking the 44-th face key point of the human face in the first image as a face center point, to obtain a fourth image; and performing a translation process on the fourth image based on the target position.

6. The method according to claim 1, wherein the performing the second movement process on the second image processed through the first movement process based on the predetermined movement trajectory comprises:

determining a time difference between a current time point and a movement start time point of the predetermined movement trajectory;

determining, based on the time difference from a predetermined movement set, a target displacement and a target rotation angle that correspond to the current time point, the predetermined movement set comprising displacements and rotation angles of the predetermined movement trajectory at a plurality of predetermined time points; and determining, based on the target displacement and the target rotation angle, a movement position of the second image processed through the first movement process at the current time point, and determining that the second image processed through the first movement process continuously moves along the predetermined movement trajectory by taking the movement position as a movement start position.

7. An electronic device, comprising:

a memory; a processor; and a computer program stored in the memory and executable on the processor, wherein the processor, when executing the computer program, causes the electronic device to:

when an obtained first image comprises a human face, perform a first transformation process on the first image to obtain a second image;

determine, based on a first target face key point of the human face in the first image, a target position, in the first image, of a second target face key point of the human face in the second image;

perform a first movement process on the second image based on the target position;

generate a target image based on the first image and the second image processed through the first movement process, and display the target image;

wherein the processor, when executing the computer program, further causes the electronic device to:

subsequent to performing the first movement process on the second image based on the target position, perform a second movement process on the second image processed through the first movement process based on a predetermined movement trajectory;

wherein generating the target image further comprises generating the target image based on the first image and the second image processed through the first movement process and the second movement process;

wherein the processor, when executing the computer program, further causes the electronic device to:

subsequent to the performing the first movement process on the second image based on the target position, add target additional information to a predetermined position of the second image processed through the first movement process to obtain a fifth image; and wherein the generating the target image based on the first image and the second image processed through the first movement process further comprises: generating the target image based on the first image and the fifth image.

8. The electronic device according to claim 7, wherein said performing the first transformation process on the first image to obtain the second image comprises:
performing a feature transformation process on respective first facial features of the human face in the first image to obtain respective second facial features matching a human face of a predetermined age group, and determining an image of a human face containing the respective second facial features as a third image; and
performing a cutout process on the third image based on a predetermined portrait mask, and determining an image obtained through the cutout process as the second image.

9. The electronic device according to claim 7, wherein the processor, when executing the computer program, further causes the electronic device to, prior to said performing the first movement process on the second image based on the target position:
add additional information corresponding to a facial feature to the second image,
wherein said performing the first movement process on the second image comprises: performing the first movement process on the second image added with the additional information corresponding to the facial feature.

10. The electronic device according to claim 7, wherein:
the first target face key point comprises a 44-th face key point and a 16-th face key point of 106 face key points, and the second target face key point is the 44-th face key point of the 106 face key points; and
said determining, based on the first target face key point of the human face in the first image, the target position, in the first image, of the second target face key point of the human face in the second image comprises:
determining a direction vector from the 44-th face key point to the 16-th face key point of the human face in the first image; and
obtaining a first position point based on a predetermined displacement factor, the direction vector and the 16-th face key point of the human face in the first image in accordance with a first predetermined calculation formula, and determining the first position point as a target position, in the first image, of the 44-th face key point of the human face in the second image.

11. The electronic device according to claim 10, wherein said performing the first movement process on the second image based on the target position comprises:
performing, based on a predetermined zoom-out factor, a zoom-out process on the second image taking the 44-th face key point of the human face in the first image as a face center point, to obtain a fourth image; and
performing a translation process on the fourth image based on the target position.

12. The electronic device according to claim 7, wherein the performing the second movement process on the second image processed through the first movement process based on the predetermined movement trajectory comprises:
determining a time difference between a current time point and a movement start time point of the predetermined movement trajectory;
determining, based on the time difference from a predetermined movement set, a target displacement and a target rotation angle that correspond to the current time point, the predetermined movement set comprising displacements and rotation angles of the predetermined movement trajectory at a plurality of predetermined time points; and
determining, based on the target displacement and the target rotation angle, a movement position of the second image processed through the first movement process at the current time point, and determining that the second image processed through the first movement process continuously moves along the predetermined movement trajectory by taking the movement position as a movement start position.

13. A non-transitory computer-readable storage medium, having a computer program stored thereon, wherein the computer program, when executed by a processor, implements operations comprising:
when an obtained first image comprises a human face, performing a first transformation process on the first image to obtain a second image;
based on a first target face key point of the human face in the first image, determining a target position of a second target face key point of the second image in the first image;
performing a first movement process on the second image based on the target position;
generating a target image based on the first image and the second image processed through the first movement process, and displaying the target image;
wherein the operations further comprise:
subsequent to the performing a first movement process on the second image based on the target position, performing a second movement process on the second image processed through the first movement process based on a predetermined movement trajectory;
wherein the generating a target image further comprises generating the target image based on the first image and the second image processed through the first movement process and the second movement process;
wherein the operations further comprise: subsequent to the performing the first movement process on the second image based on the target position, adding target additional information to a predetermined position of the second image processed through the first movement process to obtain a fifth image; and
wherein the generating the target image based on the first image and the second image processed through the first movement process comprises: generating the target image based on the first image and the fifth image.

\* \* \* \* \*